US011288403B2

(12) United States Patent
Ingraham et al.

(10) Patent No.: US 11,288,403 B2
(45) Date of Patent: Mar. 29, 2022

(54) SYSTEM AND METHOD FOR CRYPTOGRAPHIC VERIFICATION OF VEHICLE AUTHENTICITY

(71) Applicant: BAE Systems Information and Electronic Systems Integration Inc., Nashua, NH (US)

(72) Inventors: Jonathan P. Ingraham, Pelham, NH (US); Rudra Chakravorty, Nashua, NH (US); Tate J. Keegan, Candia, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 361 days.

(21) Appl. No.: 16/609,973

(22) PCT Filed: May 8, 2018

(86) PCT No.: PCT/US2018/031602
§ 371 (c)(1),
(2) Date: Oct. 31, 2019

(87) PCT Pub. No.: WO2018/208777
PCT Pub. Date: Nov. 15, 2018

(65) Prior Publication Data
US 2020/0057872 A1 Feb. 20, 2020

Related U.S. Application Data

(60) Provisional application No. 62/503,003, filed on May 8, 2017.

(51) Int. Cl.
*G06F 21/73* (2013.01)
*G06F 21/44* (2013.01)
(Continued)

(52) U.S. Cl.
CPC .............. *G06F 21/73* (2013.01); *G06F 21/44* (2013.01); *H04L 9/0891* (2013.01);
(Continued)

(58) Field of Classification Search
CPC ....... G06F 21/73; G06F 21/44; H04L 9/0891; H04L 9/3226; H04L 9/3263; H04L 2209/84
(Continued)

(56) References Cited

U.S. PATENT DOCUMENTS 9,602,290 B2  3/2017  Cizas et al.
10,184,530 B2  1/2019  Saito et al.
(Continued)

FOREIGN PATENT DOCUMENTS

WO    2012126547 A1    9/2012

OTHER PUBLICATIONS

International Search Report, PCT/US18/44355, 9 pages, dated Oct. 30, 2018.
(Continued)

*Primary Examiner* — Samson B Lemma
(74) *Attorney, Agent, or Firm* — Scott J. Asmus; Maine Cernota & Rardin

(57) ABSTRACT

A system and method for cryptographic verification of entity/vehicle authenticity, comprising generating a Vehicle Identification Number (VIN)—Key for an individual platform/vehicle; applying the VIN—Key to components of the platform/vehicle; receiving input for the platform/vehicle; validating the authenticity of the input and/or the platform/vehicle; performing the operation of the input if it was validated; terminating the operation if it was not validated; logging the operation; and decommissioning the platform/vehicle at the end of life.

17 Claims, 10 Drawing Sheets

(51) Int. Cl.
*H04L 9/08* (2006.01)
*H04L 9/32* (2006.01)

(52) U.S. Cl.
CPC .......... *H04L 9/3226* (2013.01); *H04L 9/3263* (2013.01); *H04L 2209/84* (2013.01)

(58) Field of Classification Search
USPC .......................................................... 726/26
See application file for complete search history.

(56) References Cited

U.S. PATENT DOCUMENTS

| | | | |
|---|---|---|---|
| 2007/0222585 A1* | 9/2007 | Sabol | G06Q 50/26 340/539.11 |
| 2011/0099361 A1* | 4/2011 | Shah | H04W 12/108 713/2 |
| 2014/0270172 A1* | 9/2014 | Peirce | H04L 9/083 380/270 |
| 2016/0132046 A1* | 5/2016 | Beoughter | G05B 19/4184 700/17 |
| 2016/0149878 A1* | 5/2016 | Pogorelik | H04B 13/005 380/283 |
| 2016/0300495 A1* | 10/2016 | Kantor | G08G 5/0082 |
| 2016/0379013 A1* | 12/2016 | Ganesan | H04L 63/0823 713/176 |
| 2017/0026385 A1* | 1/2017 | Zarkesh | H04W 4/80 |
| 2017/0078472 A1* | 3/2017 | Ricci | H04W 4/48 |
| 2017/0132334 A1* | 5/2017 | Levinson | G06F 30/20 |

OTHER PUBLICATIONS

International Search Report, PCT/US18/35671, 12 pages, dated Oct. 17, 2018.
International Search Report, PCT/US18/31602, 12 pages, dated Jul. 20, 2018.
Nhsta, Federal Automated Vehicles Policy, Accelerating the Next Revolution in Roadway Safety, U.S. Department of transportation, Sep. 2016, 116 pages.
McAfee, Automotive Security Best Practices, Recommendations for security and privacy in the era of the next-generation car, https://www.mcafee.com/enterprise/en-us/assets/white-papers/wp-automotive-security.pdf, Jun. 2016, 23 pages.
Jim Nichols, Volvo Cars Tests Replacing Keys with Smart Phone App, https://www.media.volvocars.com/us/en-us/media/pressreleases/173880/volvo-cars-tests-replacing-keys-with-smart-phone-app, Feb. 19, 2016, 6 pages.
Extracting Qualcomm's KeyMaster Keys—Breaking Android Full Disk Encryption, https://bits-please.blogspot.com/2016/06/extracting-qualcomms-keymaster-keys.html, Jun. 2016, 20 pages.
Paul Weissler, Intel's "bumper-to-bumper" vehicle security approach, http://articles.sae.org/14753/, Apr. 19, 2016, 2 pages.
Meiyuan Zhao, Advanced Driver Assistant System, http://www.intel.com/content/dam/www/public/us/en/documents/white-papers/advanced-driver-assistant-system-paper.pdf, May 28, 2016.
Terry Costlow, V2X communications face many challenges before deployment, http://articles.sae.org/12841/, Mar. 6, 2014, 2 pages.

\* cited by examiner

VEHICLE ENVIRONMENT

INTERFACE MODULES

SECURITY METHOD HIGH LEVEL STEPS

GENERATING VIN - KEY

APPLYING VIN- KEY TO THE ENTITY / VEHICLE COMPONENTS

PERFORMING OPERATION

LOGGING ACTIVITY

SYSTEM AND METHOD FOR CRYPTOGRAPHIC VERIFICATION OF VEHICLE AUTHENTICITY

RELATED APPLICATIONS

This application claims the benefit of U.S. Provisional Application No. 62/503,003 filed May 8, 2017, which is herein incorporated by reference in its entirety for all purposes. U.S. Provisional Application No. 62/514,266 filed Jun. 2, 2017 and U.S. Provisional Application No. 62/540,264 filed Aug. 2, 2017 are herein incorporated by reference in their entireties for all purposes.

FIELD OF THE DISCLOSURE

Embodiments relate to a system and method for secure interactions with entities and, more particularly, to cryptographic verification of vehicle authenticity.

BACKGROUND

Current methods for validating entity/vehicle authenticity are not cryptographically based or immutable. This allows a broad attack surface for cyber and reverse engineering threats which will continue to emerge as the modern vehicle becomes more connected and more software centric. As used herein, vehicle refers to any moving platform such as automobiles, buses, trucks, trains, ships, planes, drones, and the like. For illustrative purposes the automobile application is described in greater detail.

A Vehicle Identification Number (VIN), also called a chassis number, is a unique code, including a serial number, used by the automotive industry to identify individual vehicles since 1954. In 1981, the National Highway Traffic Safety Administration (NHTSA) of the United States standardized the format, containing 17 characters. As used herein, the VIN is any unique code that identifies a vehicle.

Vehicle identity is validated by the VIN number which is attached to the vehicle in multiple places and recorded in the vehicle computer. However, the VIN number is not immutable. With the increase in software and firmware within vehicles, interactions with command and control or update servers via Over the Air (OTA) updates, self driving capabilities, and the ability to hack a vehicle remotely, there is a need to cryptographically verify a specific vehicle and ensure the software and firmware executing within it and its related computing environment are authentic.

Modern automotive platforms (light & heavy duty) are internet connected and susceptible to attack and reverse engineering as evidenced by the 2015 Jeep Cherokee remote access hack that was widely publicized and provided full access to the vehicle's controls. This is a target rich environment for attackers, because physical access is readily available and there are currently limited protections. Particularly, the connected automotive platform is considered one of the next big attack surfaces for hackers. The problems to be solved include the protection of intellectual property, limiting OEM and end user liability, protecting the end user's data, guaranteeing all commands and inputs processed by the vehicle come from authenticated human or machine generated sources, and ensuring availability to the end user.

Regarding these problems, many threats exist, including attacks via the vehicle's wireless and cellular interfaces, as well as from devices plugged into a vehicle Controller Area Network (CAN) bus through the On-Board Diagnostics (OBD) port. In addition to potential wireless access, it is possible for a Trojan horse or other malicious code to be installed through updates when physical access to the OBD port is available, and attacks have also been demonstrated via wireless connectivity as well. Access could come from aftermarket devices such as insurance dongles, OBD II scanners, aftermarket programmers or controllers, cell phones, and their related Apps. When it is considered that many vehicles rely on over 100 million lines of code, the complexity of the problem is apparent. Vulnerabilities have been proven such as in 2013 when Charlie Miller and Chris Valasek hacked a Prius via physical access, and their remote hacking of a Jeep Cherokee in 2015. In 2015, the access was through the Harman Kardon radio and a Uconnect computer, which gave them remote access to the vehicle systems through the cellular carrier Sprint used by Chrysler. This initiated the first ever cyber-security motivated automotive recall, impacting 1.4 million vehicles. Recall resolution software update problems have further demonstrated the difficulties involved in securing vehicle systems, whereby recalls fail or apply the wrong patches to the wrong vehicles.

Even some cryptographic techniques are vulnerable to reverse engineering attacks. Researchers reverse engineered a component in a Volkswagen's internal network. They extracted a single cryptographic-key value shared by millions of Volkswagen vehicles. They did this by intercepting another value unique to the target vehicle sent every time a driver presses the key fob buttons. The two supposedly secret values can be combined to clone the key fob and access the car. Even central servers that provide Over The Air (OTA) updates have vulnerabilities and need to incorporate cyber protection. Recently, security researcher Benjamin Kunz Mejri revealed zero-day vulnerabilities that reside on BMW's web domain and ConnectedDrive portal. One example is a VIN (Vehicle Identification Number) session vulnerability which resides on the official BMW ConnectedDrive online service web-application.

What is needed is a solution that provides cryptographic assurances that an entity/vehicle is authentic, serves as the basis for secure updates and identification, that can validate original OEM components, is scalable, updatable, and portable, and retrofits into existing products.

SUMMARY

An embodiment provides a system for cryptographic verification of immutable authenticity of an entity, comprising applying a Vehicle Identification Number (VIN)—Key to components of the entity (410); receiving input for the entity (415) by at least one of a long range wireless communication module (310), a short range wireless communication module (315), Bring Your Own Devices (BYODs) aftermarket communication modules (320), and physical interface communication modules (325); validating authenticity of at least one of the input and the entity (420) in a security module (345); performing operation of the input if validated (425); and logging the operation (430), whereby the authenticity of the entity is immutable and cryptographically verified. In embodiments the entity is a vehicle (110). Other embodiment further comprise generating the VIN—Key for an individual the entity (405). Subsequent embodiments further comprise terminating the operation if not validated (420). For additional embodiments a step of generating a VIN—Key for an individual entity (405) comprises obtaining a VIN for an individual entity (505) from a trusted source obtained by accessing a database; issuing a crypto certificate for the individual entity associated with the VIN (510); and associating the crypto certificate with the VIN for the individual entity (515). In another embodiment, the step of applying the VIN-Key to the entity (410) comprises one of using a fuse key based processor comprising a hardware based 'secret' embedded into it as a root of trust (610); authenticating additional data and or unlocking additional keys to validate software and or firmware running within the entity (615); or using a symmetric split key (620) such that an end user has a half of the symmetric split key, and the entity holds an other half in one or a series of hardware based secrets; encrypting the code and or firmware based on multiple the symmetric split key (625), such that all portions of the split key are required to decrypt code. For a following embodiment the step of receiving input for the entity (415) comprises receiving an update (705) as a signed only or encrypted and signed file; verifying authenticity (710) in the security module (345); directing input (715); either transmitting the encrypted and signed or signed only update file to its end use point location (720); and verifying and decrypting the encrypted and signed or signed only update file at the end use point location (725); or verifying and decrypting (730) the encrypted and signed or signed only update file in the security module (345); and transmitting the decrypted update file to end use location (735); and logging activities (740). In subsequent embodiments the step of validating authenticity of input and the entity comprises receiving input for a programming update for the entity (805); providing programming (810) to security module (345); confirming programming authenticated (815); if the programming authenticated not confirmed, terminating programming update (820); if the programming authenticated is confirmed, directing input (825); either decrypting by the security module (345); and providing the decrypted update to module for programming (830); or providing the encrypted update to the module for programming (835); confirming programming authenticated (840); if programming not authenticated, terminating programming update (820); if programming is authenticated, logging activities (845). In additional embodiments the step of performing the operation (425) comprises one of decrypting input update for programming for entity module, or receiving a decrypted update (905); confirming the VIN at the module (910); confirming update version at the module (915); confirming the entity ready (920); if the entity not ready, return to the confirming entity ready step (920); if entity is ready, updating the module (925); confirming the update (930); and logging activities (935). In ensuing embodiments the step of logging the activity comprises creating a record (1005); adding all data to the record (1010); signing the record (1015); and saving the record (1020). In included embodiments the entity is selected from the group consisting of robots, medical devices, energy infrastructure, automobiles, buses, trucks, trains, watercraft, planes, and drones. In yet further embodiments the entity is a vehicle and processing elements of an environment of the vehicle comprise a USB processor (210); a Bluetooth processor (215); a Dedicated Short Range Communications (DSRC)-based receiver (V2X) 220; a passive keyless entry processor (225); a remote key processor (230); a Tire Pressure Monitoring System (TPMS) processor (235); an Advanced Driver Assistance Systems (ADAS) system Electronic Control Unit (ECU) (240); an interior and exterior lighting system ECU (245); an engine and transmission ECU (250); steering and braking ECU (255); vehicle access system ECU (260); smartphone/OTA updates (265); command and control servers at an Original Equipment Manufacturer (OEM) (270); a streaming media connection processor (275); a remote link type application processor (280); an airbag ECU (285); and an OBD II processor (290). Related embodiments comprise a security Electronic Control Unit (ECU) (115, 205) coupled to components of the entity. Further embodiments comprise decommissioning the platform/vehicle at end of life (435).

Another embodiment provides a method for cryptographic verification of immutable authenticity of an entity, comprising applying a Vehicle Identification Number (VIN)—Key to components of the entity (410); receiving input for the entity (415); validating authenticity of at least one of the input and the entity (420); performing operation of the input if validated (425); and logging the operation (430), whereby the authenticity of the entity is immutable and cryptographically verified. For yet further embodiments, the entity is a medical device, and the verification comprises identifying the medical device to authenticate software/firmware executing on it. For more embodiments, the entity is a drone, and the verification comprises drone identification within an airspace. Continued embodiments include that the entity is a device component of an Internet of Things (IoT), and the verification comprises identifying the IoT device to authenticate software/firmware executing on it. Additional embodiment include a non-transitory computer-readable medium comprising instructions stored thereon, that when executed on a processor, performs the method for cryptographic verification of immutable authenticity of an entity.

A yet further embodiment provides a system for cryptographic verification of immutable authenticity of a vehicle, comprising generating a VIN—Key for an individual entity (405) comprising obtaining a VIN for an individual entity (505) from a trusted source obtained by accessing a database; issuing a crypto certificate for the individual entity associated with the VIN (510); associating the crypto certificate with the VIN for the individual entity (515); applying a Vehicle Identification Number (VIN)—Key to components of the vehicle (410) using a symmetric split key (620) such that an end user has a half of the split key, and the entity holds an other half in one or a series of hardware based secrets; receiving input for the vehicle (415) by at least one of A long range wireless communication module (310), a short range wireless communication module (315), Bring Your Own Devices (BYODs) aftermarket communication modules (320), and physical interface communication modules (325), using a symmetric split key (620) such that the end user has a half of the split key, and the entity holds an other half in one or a series of hardware based secrets; validating authenticity of at least one of the input and the vehicle (420) in a security module (345) comprising receiving input for a programming update for the entity (805); providing programming (810) to security module (345); confirming programming authenticated (815); if the programming authenticated not confirmed, terminating programming update (820); if the programming authenticated is confirmed, providing decrypted update to module for programming (825); confirming programming authenticated (830); if the programming authenticated not confirmed, terminating programming update (820); and logging activities (835); performing operation of the input if validated (425); and logging the operation (430), whereby the authenticity of the vehicle is immutable and cryptographically verified.

Figure 1:
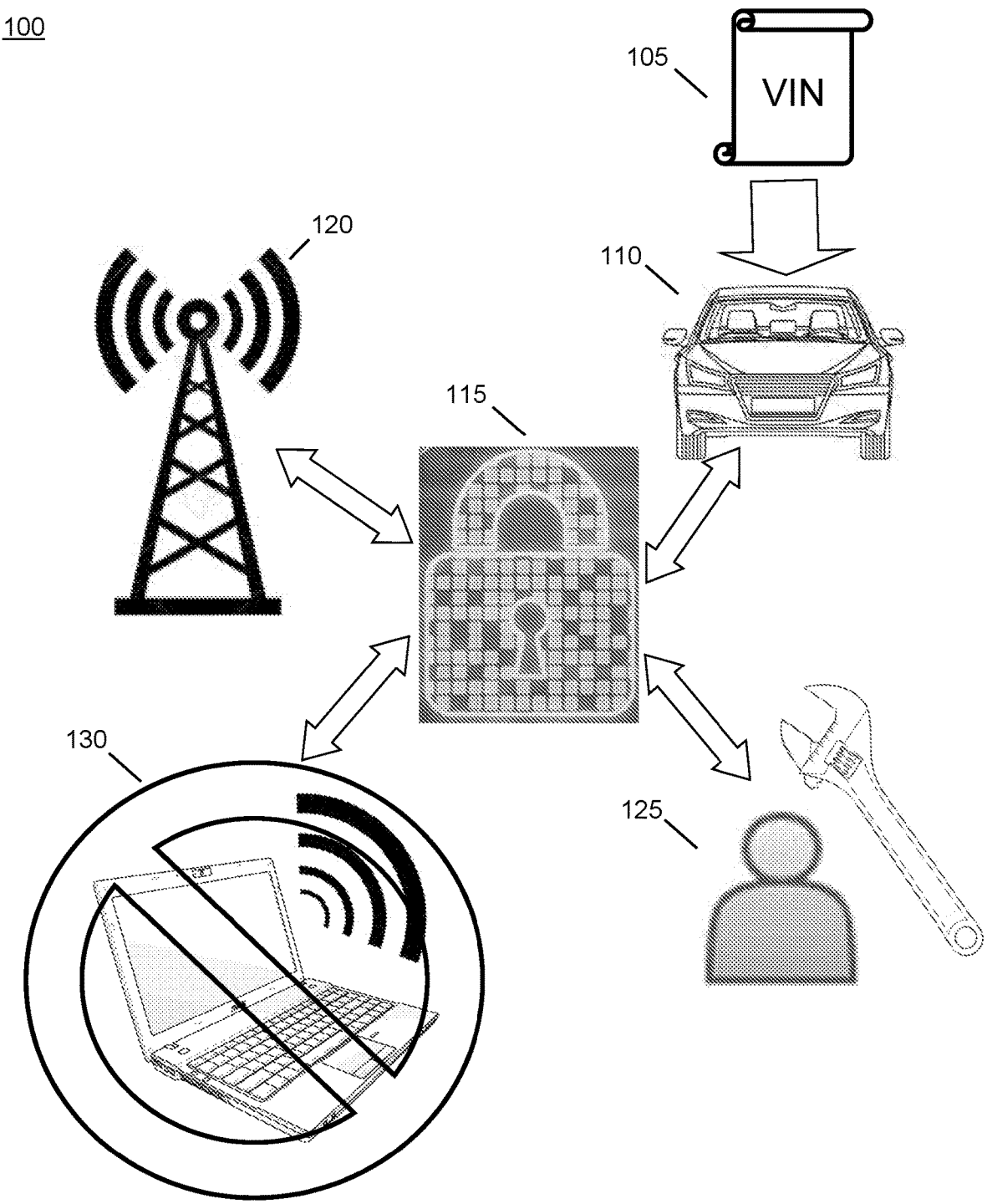
FIG. 1 depicts a security configured operational environment configured in accordance with an embodiment.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. "Entity" can refer to stationary objects such as nonlimiting examples of robots, medical devices, and energy infrastructure as well as mobile vehicles. As used herein, "vehicle" refers to any moving platform having or having access to computer processing capability and software/firmware such as automobiles, buses, trucks, trains, ships, planes, drones, and the like. The system and methods are applicable to many embodiments. What follows is illustrative, but not exhaustive, of the scope of the system and methods.

A first set of embodiments considers "vehicles" operating within an environment either autonomously or not (cars on the road, drones in the sky, robots in a factory). A second set of embodiments considers medical, infrastructure, and energy devices where the emphasis is on the authenticity and integrity of the devices and their embedded software/firmware to close an attack surface. Therefore, while some disclosed embodiments are automotive-focused, including autonomous vehicle and vehicle to everything (V2X) communication applications, embodiments include those that incorporate serial numbers or other identifiers of subsystem components such as commercial flight control modules or hybrid bus drive systems. Other applications comprise aerospace, including drone identification within an airspace, medical electronic devices (such as insulin pumps and artificial pacemakers), infrastructure, transportation, energy, and software systems. Embodiments include robots that communicate with each other in a factory. Generally, embodiments identify unique 'devices' on a 'network' such as for Internet of Things (IoT) applications. They provide a two-fold capability. A first is verifying the identity of an entity to ensure the software/firmware executing on it is authentic. A second considers a revenue stream. The sensors in next generation vehicles collect significant, valuable, data. Offloading, managing, handling, analyzing, and leveraging this data is significant. Embodiments provide 1) the ability to secure their data within the vehicle, 2) the data miner with the ability to know which entity developed the data and control distribution and use, and 3) the ability to verify the identity of a vehicle/entity.

Applying cryptographic protections to the VIN within the vehicle make it cryptographically immutable. This provides cryptographic assurances that the vehicle is authentic and correctly identified which is necessary for secure software and firmware updates, warranty claims, and theft recovery. Other benefits include end user identity protection, validation of data generated by on board sensors, and OEM intellectual property protection.

Embodiments allow for retrofit into existing products, and scales to large and small networks (CAN bus to Ethernet speeds). They are updatable and portable as hardware evolves, and can validate original OEM components. For example, the heavy trucking industry has concerns about traffic on the CAN bus, and retrofit options provide solutions.

By implementing a cryptographically immutable key within the vehicle which is tied to the VIN and, in embodiments, issuing the vehicle a cryptographically generated certificate (one example being an X.509 certificate), the authenticity of the vehicle and operator can be verified by cryptographic methods. This can then be used to authenticate software and firmware updates applied to the vehicle such that improperly encrypted and signed updates will not verify, decrypt and execute. Cryptographically immutable event log data is recorded by the vehicle to not only validate software and firmware builds executing, but vehicle state (and driver) during an accident.

Embodiments assist in securing an automotive (light or heavy duty) platform from exploitation and reverse engineering within the existing hardware infrastructure. In one example it can securely boot a subset of FPGAs and/or processors. They validate that code executing within those devices is cryptographically authentic. They provide protections from intellectual property theft and Jeep style cyber attack. Embodiments force reverse engineering to execute more invasive attacks. They validate the number of nodes executing within the system (see FIG. 2). If each of these modules talked to each other, (and ran validated code), then when one was missing this would be detected and a check engine light is displayed and the car put in some type of reduced capability mode. Embodiments frustrate reverse engineering while protecting code (e.g.: firmware and software) and intellectual property. This ensures that OTA or local code updates are authentic and not malicious, and prevents reverse compiling of encrypted code (IP protections). Remote attacks are deterred, and in some cases prevented. The use of autonomous vehicles heightens the concerns as the vehicles could be operating without any human interaction and have no ability to stop or prevent the automated operations.

While vehicle to vehicle and vehicle to infrastructure communications should be secure, these nodes could easily be spoofed by an attacker. For example, false V2X reports incorrect distances between vehicles or traffic light color, resulting in an accident. Adding a crypto identity with valid certificates to this architecture means that each node could be determined to be authentic, adding a layer of assurance against attack. However, cross validation of certificates between vehicles at highway speed and congestion is a consideration.

An embodiment provides a system and method for cryptographic verification of vehicle authenticity, comprising applying a VIN—Key to components of a vehicle; receiving input for the vehicle; validating authenticity of the input and/or the vehicle; performing operation of the input if validated; and logging the operation. Other embodiments further comprise decommissioning the entity/vehicle at the end of life. Subsequent embodiments further comprise generating the VIN—Key for an individual entity/vehicle. Continued embodiments further comprise terminating the operation if not validated. Another embodiment provides a system for cryptographic verification of entity/vehicle authenticity comprising a security electronic control unit coupled to the components of the entity/vehicle. A yet further embodiment provides a non-transitory computer-readable medium for cryptographic verification of entity/vehicle authenticity, comprising instructions stored thereon, that when executed on a processor, perform the processing of applying a VIN—Key to components of an entity/vehicle; receiving input for the entity/vehicle; validating authenticity of the input and/or the entity/vehicle; performing operation of the input if validated; and logging the operation.

FIG. 1 depicts a security configured operational environment 100 according to one embodiment for automobiles. Shown are initial security implementation 105 of vehicle components 110 such as the VIN or unique object identifier, along with associated hardware and software that are tied to the VIN such as through the vehicle hardware and software. Once initiated, security unit 115 operates for interactions with vehicle 110, including over the air (OTA) 120 communications such as wireless communications. Interactions also include maintenance 125 which can involve software, firmware, and hardware updates and replacements by the vendor and third parties that interface to the security unit 115. Security unit 115 prohibits unauthorized interaction 130, such as by OTA and by direct interaction.

Additionally, there are some complexities with repair and aftermarket such as counterfeit and grey goods. The Federal Trade Commission and the Magnusson Moss act require that aftermarket parts and repairs are allowed but a consumer may wind up paying for original equipment manufactured (OEM) parts but actually get lower quality and lower cost counterfeit parts. For original memory-based components that had authentic software/firmware tied to this certificate, special solutions can be applied to authenticate components. These complexities surface in ownership questions. For example, who owns a tractor and should have control over unlocking its systems? The tractor manufacturer and seller, or the purchaser and owner? This points to the fact that a VIN-based Certificate Authority could issue different certificates for the manufacturer/seller and the owner or potential renter of the equipment. Each stage would require a registration and the result would be cryptographic credentials which allow different functionality based on role; such as a renter being unable to update anything in vehicle controls, but able to update radio preferences. Whereas the owners would have the expanded capability to update software and firmware items.

Figure 2:
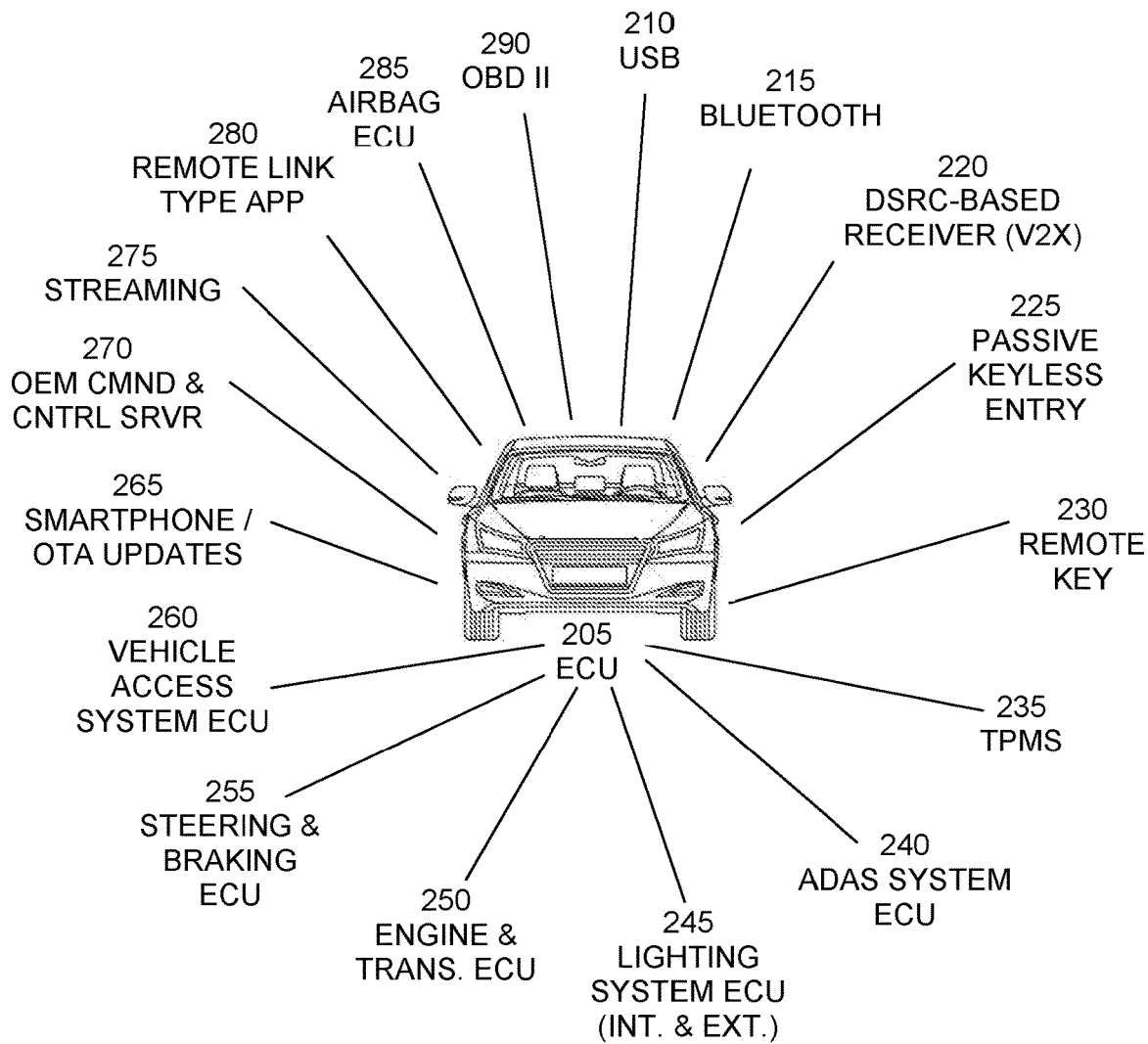
FIG. 2 depicts the environment from a vehicle perspective, configured in accordance with an embodiment.

FIG. 2 depicts environment 200 from a vehicle perspective, including communications related components, operation components, and safety components. Components depicted in the figure are processing elements either by having processor and software/firmware, or by access to processor and software/firmware. A vehicle is portrayed in the middle, with each processing node connected to the security electronic control unit (ECU) 205 like the spokes of a wheel. In general terms, a security electronic control unit (ECU) 205 becomes the root of trust for the vehicle. Since each of these items communicates, there is an attack surface which the crypto authenticity helps mitigate. For example, the Jeep Cherokee hack was possible because the attacker was able to take over a processing element, install rogue code, and communicate with the ECU. In this example, various modules and electronic control units in the vehicle environment have one or more processors coupled to one or more memory unit. Other modules and electronic control units may have controllers or processors without memory. Certain modules and electronic control units may have transceivers, receivers or be coupled to transceiver or receiver units and receive secure software and firmware updates, instructions, commands, or other information.

Referring again to FIG. 2, processing elements of the vehicle environment in one embodiment may comprise USB 210; Bluetooth 215; Dedicated Short Range Communications (DSRC)-based receiver (V2X) 220; passive keyless entry 225; remote key 230; Tire Pressure Monitoring System (TPMZS) 235; Advanced Driver Assistance Systems (ADAS) system ECU 240; lighting system ECU (interior and exterior) 245; engine and transmission ECU 250; steering and braking ECU 255; vehicle access system ECU 260; smartphone/OTA updates 265; command and control servers at the OEM 270; streaming media connection 275; remote link type apps 280; airbag ECU 285; and OBD II 290. Given LTE connection in vehicles, streaming paid content and streaming mined data out (road condition, traffic, user streaming preferences, user location, etc.) all benefit from cryptography for authenticity, integrity, and confidentiality.

Figure 3:
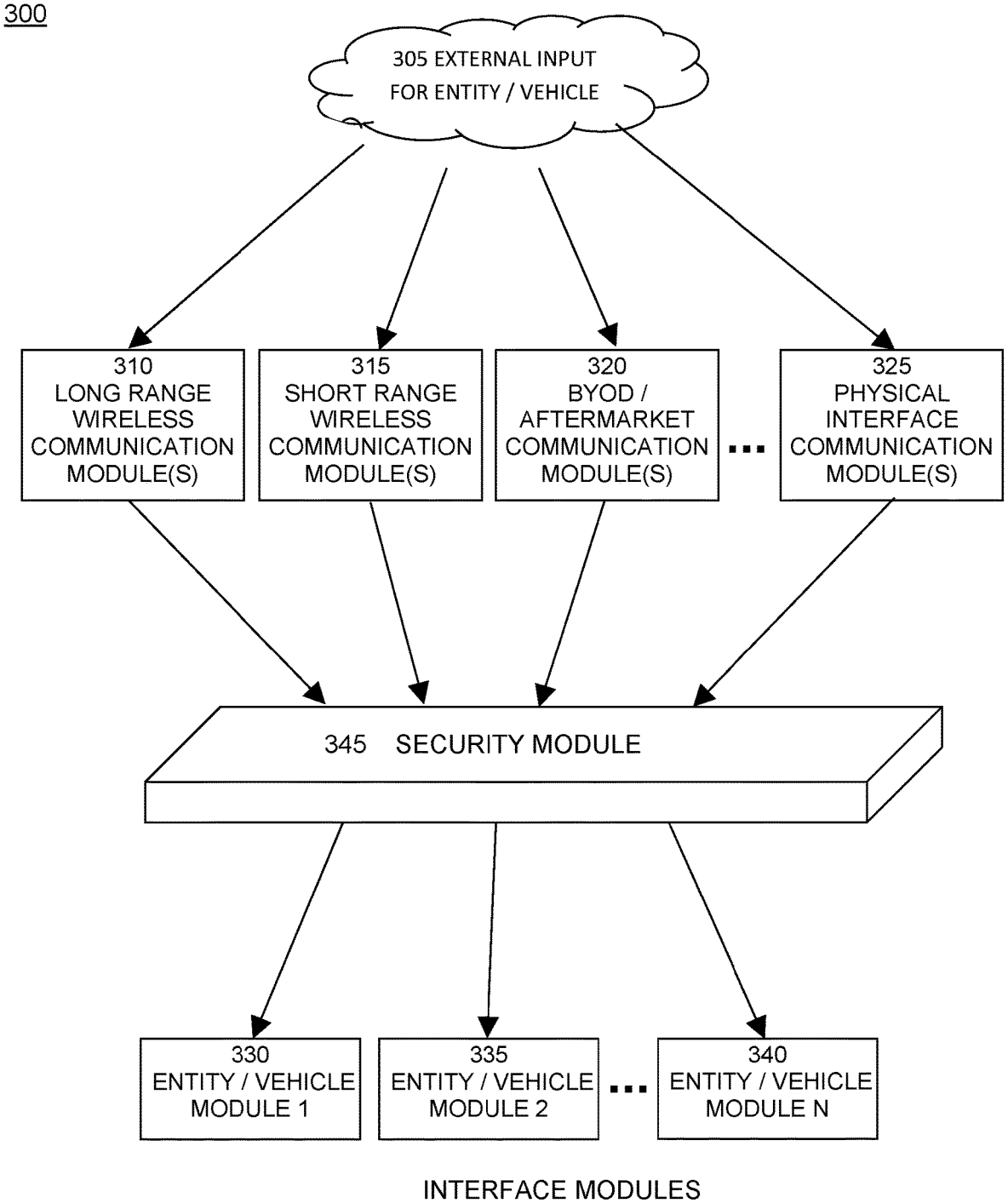
FIG. 3 is a high level block diagram of a VIN-associated security system configured in accordance with an embodiment.

FIG. 3 is a high level block diagram 300 of components of a VIN-associated security method according to one embodiment. External input 305 for the entity/vehicle can come from many sources. These include long range wireless communications 310, short range wireless communications 315, Bring Your Own Devices (BYODs)/aftermarket communication modules 320 (which can convert between wired and wireless), and physical interface communication modules 325. Before interfacing with entity/vehicle modules 330, 335, 340, all communications pass through one or more security modules 345. The security module or modules in one example is an electronic module with processing capability and memory that compares the incoming communications intended for components to authentication criteria such as the VIN. One example of this would be a malicious actor who would like to send a command to a vehicle to disable a vehicle module, like the brakes. The security module would be responsible for checking the validity and authenticity, and potentially enforcing confidentiality, of the incoming malicious command. Valid, authentic commands intended for the vehicle modules would be cryptographically signed using a private key held by trusted users like vehicle owners, fleet operators, law enforcement, OEMs, or in-vehicle safety systems like OnStar. A malicious actor would not have access to the private key, and therefore would not be able to create valid, properly signed messages. The security module would not pass those malicious, improperly signed, messages to the intended vehicle module. In another example, the security module processing is a software program that is stored on existing vehicle equipment. The current OBD II standard connector and CAN bus outputs data via the CAN ICD, and this system in one embodiment adds a layer on top of this such that the computer resources cannot be re-flashed without valid code or authentication. In this example, the security module would validate the signature of the code to be updated via the CAN ICD. Additional data would be added to the normal messages that transmit the code to the vehicle module for the purposes of security, essentially expanding the CAN ICD. The additional data would contain the signature of the code, which would be created using a private cryptographic key by a trusted user (as described above). If data were presented to the security processor with commands to save the data to non-volatile memory in the vehicle module, that data would only be written to non-volatile memory or acted upon by the vehicle module if the security module validates the signature of the data.

Figure 4:
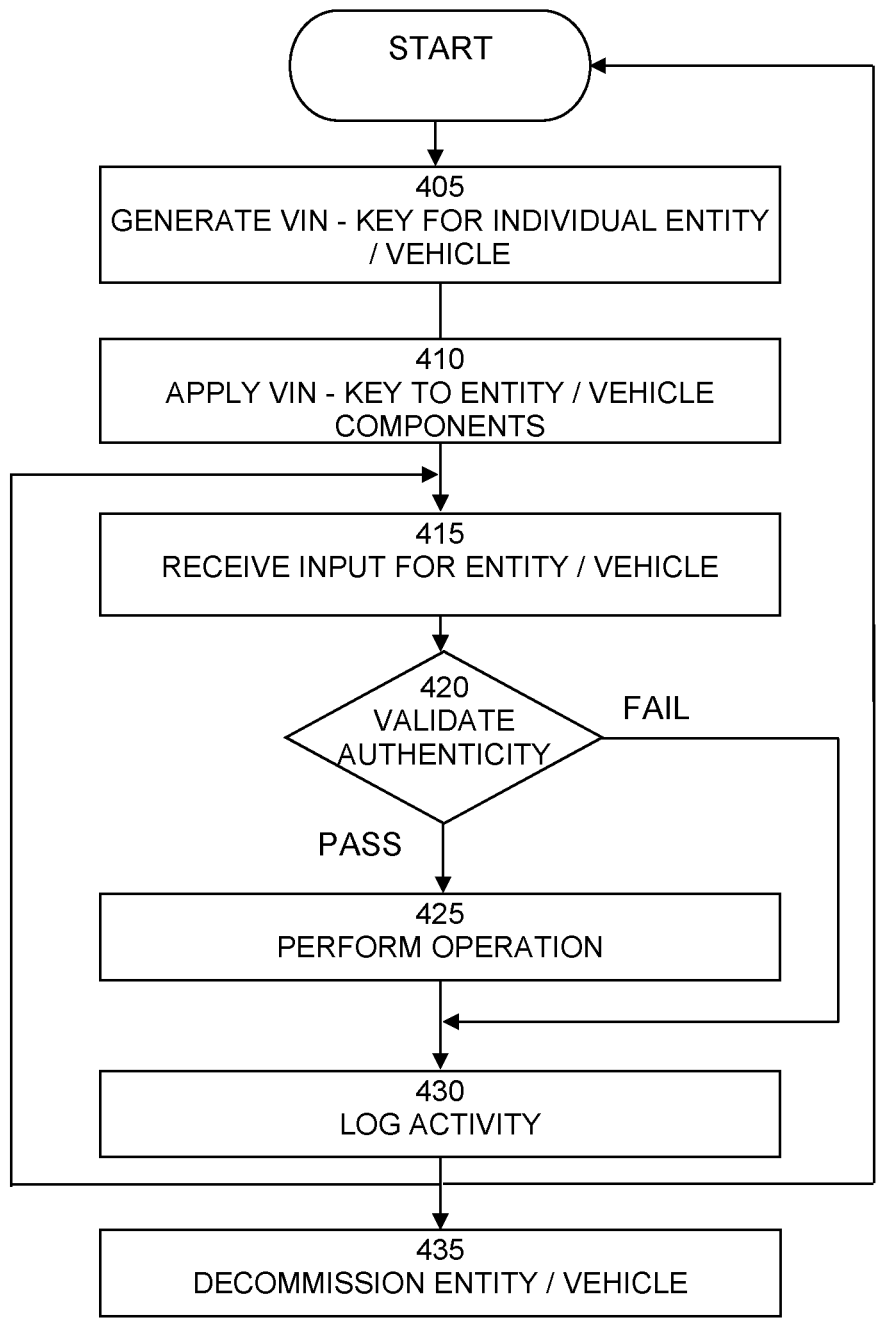
FIG. 4 is a high level flowchart of a VIN-associated security method configured in accordance with an embodiment.

FIG. 4 is a high level flowchart 400 of steps of a VIN-associated security method according to one embodiment. The process comprises generating a VIN—Key for an individual entity/vehicle 405. In one example, this is performed during the manufacture of the entity/vehicle and the installation of the components. In another example the generation of the VIN—Key is performed on operational entities/vehicles as a service. Applying the VIN—Key to the entity/vehicle components 410, which is further detailed herein. In both examples, the VIN—Key must be applied and signed by a trusted source. Once the VIN—Key is applied to the entity/vehicle components, it provides a mechanism to uniquely identify the components. New components can be added, and the VIN—Key would be applied to the new components. Receive input for the entity/vehicle 415 such as updates, commands, instructions or information that is intended to be stored and/or processed by one or more processing units and one or more memory components. Validate authenticity of the input and entity/vehicle 420. This ensures that the input designated to one or more components is from a trusted source and has not been exploited or otherwise corrupted. If validated, the system performs the operation by allowing the input to proceed to one or more components 425. If not validated, the system does not allow the input to proceed to the components and does not perform the operation. A log of activity 430 is generated to provide an audit trail and in one example includes attributes such as a time stamp, name of the input file/descriptor, and intended destination component. In one example, the process of receiving inputs 415, validating authenticity 420, performing operations 425 and logging activity 430 is repeated for each input or series of inputs. At end of life of the entity/vehicle, the system decommissions the entity/vehicle 435. In a further example, the entire input and component history can be retrieved providing a complete log for the entity/vehicle. Such data can be used, for example, in accident reconstruction, personal injury actions, recalls, and the like.

Figure 5:
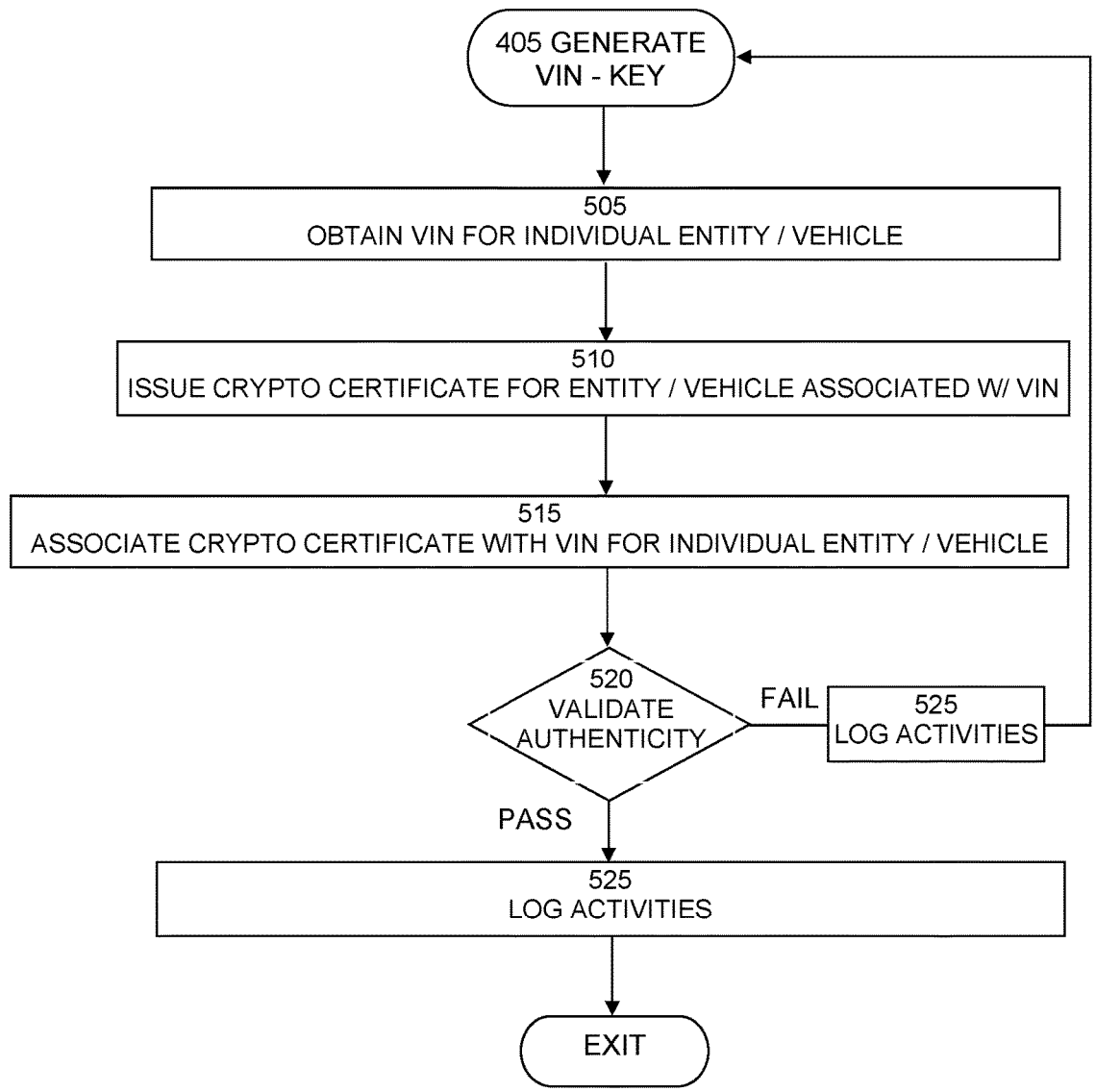
FIG. 5 is a detail level flowchart for the step of the OEM or their approved designate generating a VIN—Key for an individual entity/vehicle configured in accordance with an embodiment.

FIG. 5 is a detail sub-figure flowchart 500 of step 405 in FIG. 4 according to one embodiment. Details for the step of generating a VIN—Key for an individual entity/vehicle comprises obtaining or generating a VIN for an individual entity/vehicle 505. Typically this would be from a trusted source and obtained by accessing a database. In an automobile assembly example, the VIN would be created based on the specifics of the car being built and by a serial number created by the OEM automotive manufacturer on their corporate network. When a vehicle is at a point in its manufacturing process that it can accept the crypto certificate, then the certificate for that vehicle would be created by software which would reach into the VIN database, extract the appropriate VIN for the specific vehicle being built, and create a crypto certificate using private certificate authority keys held on the manufacturer's corporate network. This crypto certificate would then be sent to the vehicle, and put in a database in case it is needed again in the future. The system issues a crypto certificate for the entity/vehicle associated w/VIN 510. The system processing includes associating the crypto certificate with the VIN for an individual entity/vehicle 515. According to one example, the VIN is a unique identifier for the entity/vehicle and is used to validate authenticity of the entity/vehicle 520. If validated, the system logs the activity 525. If the authentication fails, the system logs the failed activity 525. In one example, the system returns to the start of the process. Embodiments comprise cryptographic certificates (X.509 certificates is one example). For embodiments, the root certificate is maintained by the issuing authority in a protected environment, providing the ability to generate follow on certificates. The derivative certificate is maintained by the entity/vehicle. Embodiments have a root certificate and key used to sign updates. The end use device has a derivative cert that authenticates the update.

Figure 6:
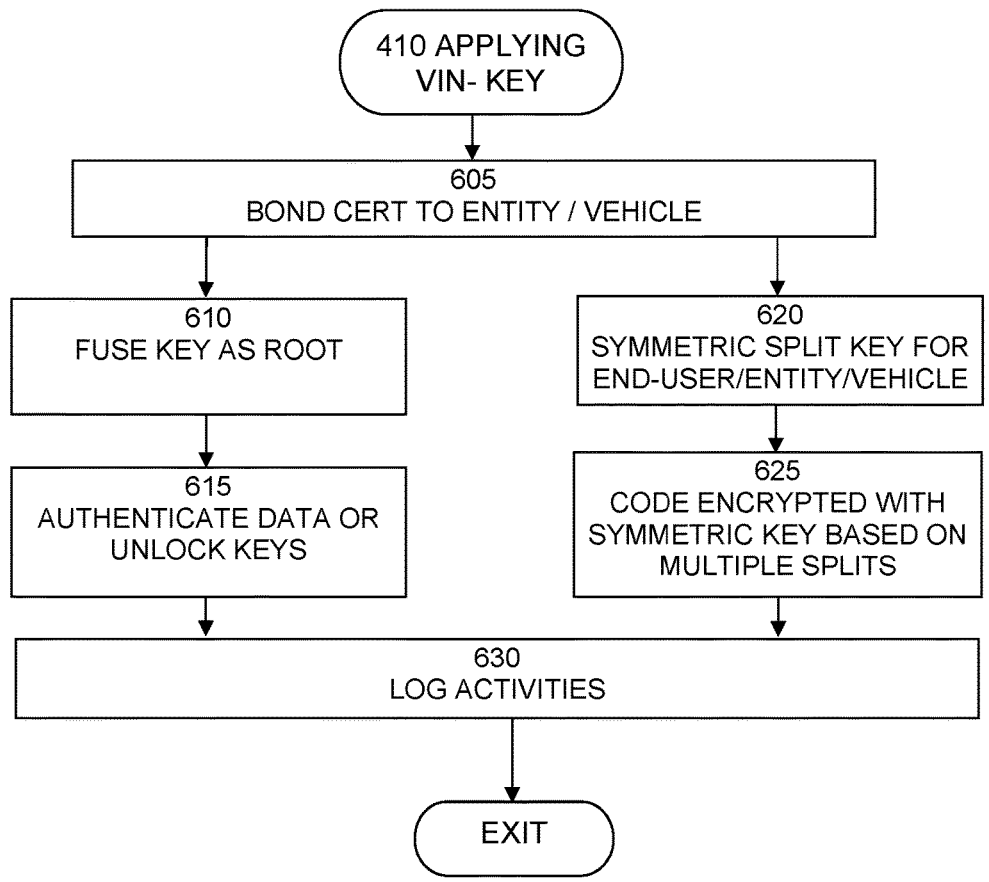
FIG. 6 is a detail level flowchart for the step of applying the VIN—Key to the entity/vehicle components configured in accordance with an embodiment.

FIG. 6 is a detail sub-figure flowchart 600 of step 410 in FIG. 4 according to one embodiment. Details for the step of applying the VIN—Key to the entity/vehicle components comprise bonding the certificate/key to the entity/vehicle 605. Depending on the cryptography used, there are several ways to do this. One example uses a fuse key based FPGA or processor that has a hardware based 'secret' embedded into it as a root of trust 610. This would then authenticate additional data or unlock additional keys to validate the software and firmware running within the entity/vehicle 615. In one example, not all of the code (software/firmware) within the entity/vehicle has to be encrypted, and just the core intellectual property and safety critical elements would be encrypted. However, authentic code is needed to execute to load the encrypted code. This authentic code is only signed such that it cannot be changed. In another example, all the code is encrypted. A second example is with a symmetric split key for end-user/entity/vehicle 620 such that the end user has half the key, and the entity/vehicle holds the other half in a hardware based secret or series of hardware based secrets. The code would then be encrypted with symmetric key based on multiple splits 625 such that all portions of the split are required to decrypt the code. Embodiments need signed only code to handle basic functionality to proceed for the later stages of authentication and execution. In each case/path activities are logged 630. Although a hardware root is preferred, embodiments do not need a hardware base for the split key. Certain embodiments use public/private keys, putting the public key on the entity/vehicle and keeping the private key in protected areas on the vehicle/entity's corporate network.

Figure 7:
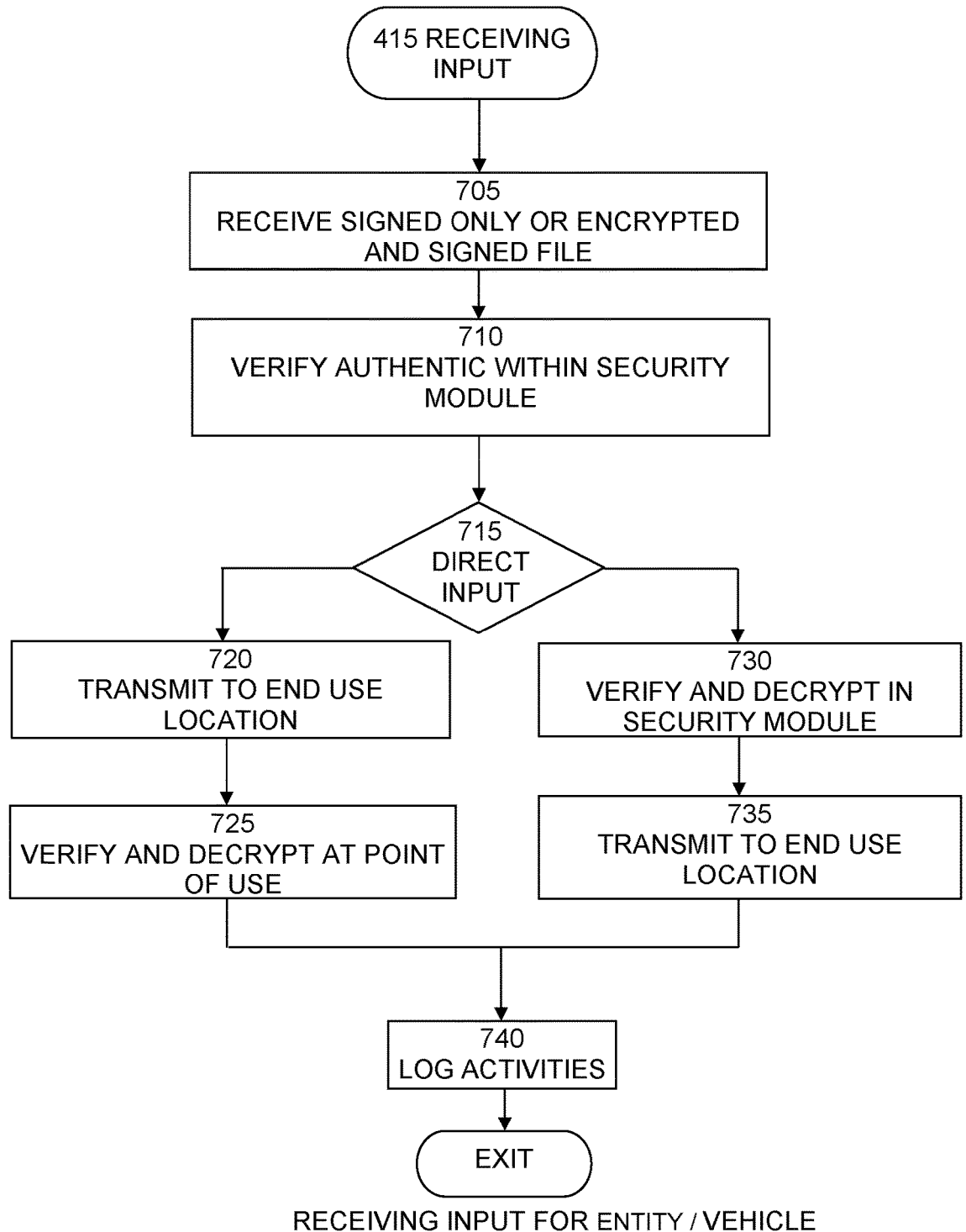
FIG. 7 is a detail level flowchart for the step of receiving input for the entity/vehicle configured in accordance with an embodiment.

FIG. 7 is a detail sub-figure flowchart 700 of step 415 in FIG. 4. Details for the step of receiving input for the entity/vehicle comprises receiving an update as a signed only or encrypted and signed file, preferably validated by the security module 705, verify authentic within security module 710, and direct input 715. For some current architectures that is not possible for all devices due to the fact that there are no methods to store cryptographic keys or the code to perform the authentication/decryption in the current end points. If the architecture is not compatible, then security module validation is employed. Following step 715, input is directed to transmit to end use location 720 and is then verified and decrypted at the point of use, or is verified and decrypted in security module 730 and then transmitted to end use location 735. Activities are then logged 740.

Figure 8:
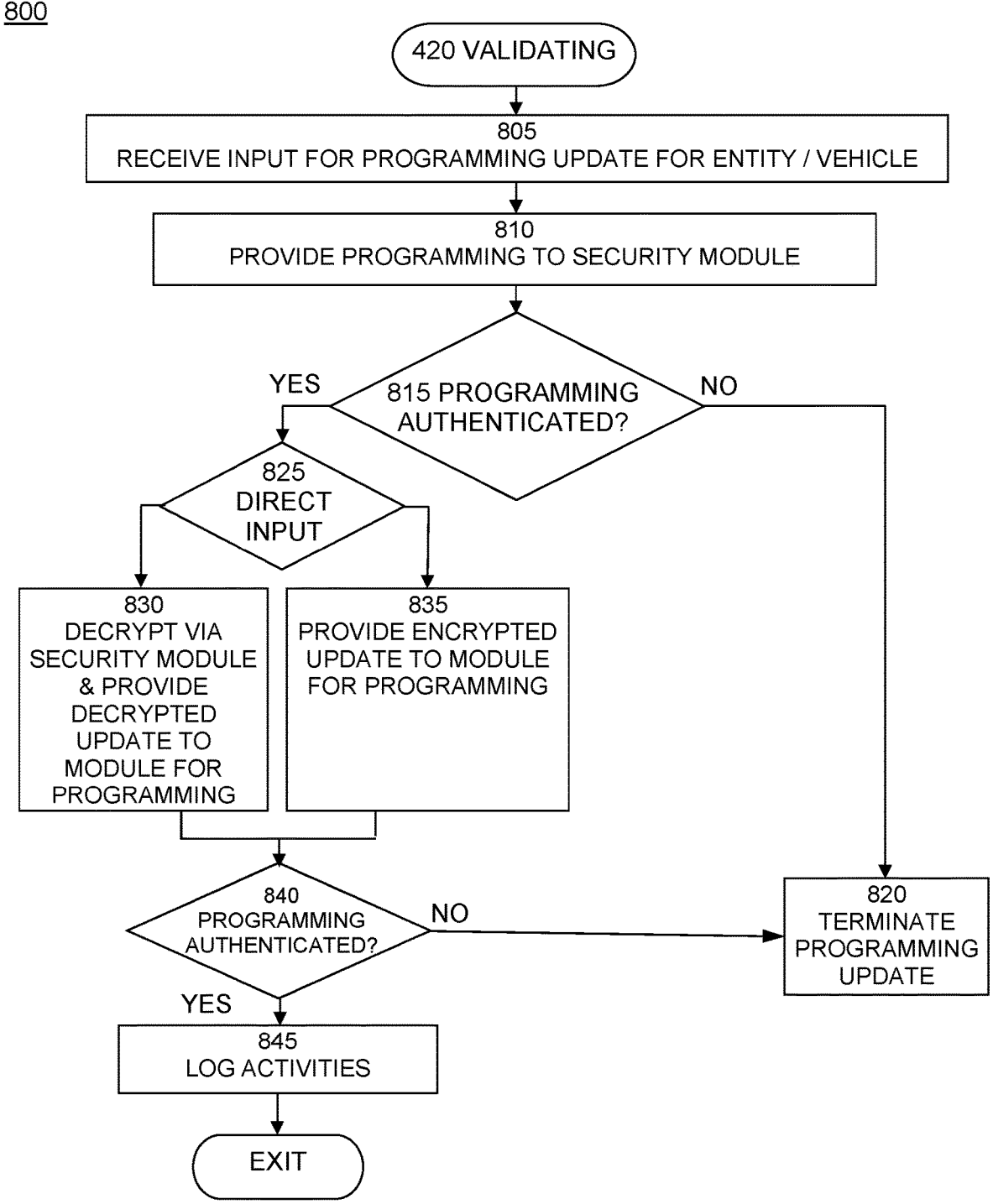
FIG. 8 is a detail level flowchart for the step of validating the authenticity of input and the entity/vehicle configured in accordance with an embodiment.

FIG. 8 is a detail sub-figure flowchart 800 of step 420 in FIG. 4. Details for the step of validating the authenticity of input and the entity/vehicle comprise receiving input for programming update for entity/vehicle 805; providing programming to security module 810; is programming authenticated? 815; if no, terminate programming update 820; if yes, direct input 825 to either decrypt via security module & provide decrypted update to module for programming 830 or provide encrypted update to module for programming 835. Then, if programming authenticated? 840 is no, terminate programming 820, if programming authenticated? 840 is yes, log activities 845 and exit. Validation is by the security module and, if possible, also the end use location. For embodiments, the decrypted input is not provided to the module for programming as this provides an attack surface to intercept the update in transit. The end use module should (in the best case scenario) do the authentication and decryption internally such that the update is always encrypted in transmit. The security module can authenticate and decrypt a first layer of encryption, the most robust implementation is for final authentication and decryption to occur at point of use in cases where there are multiple layers of encryption.

Figure 9:
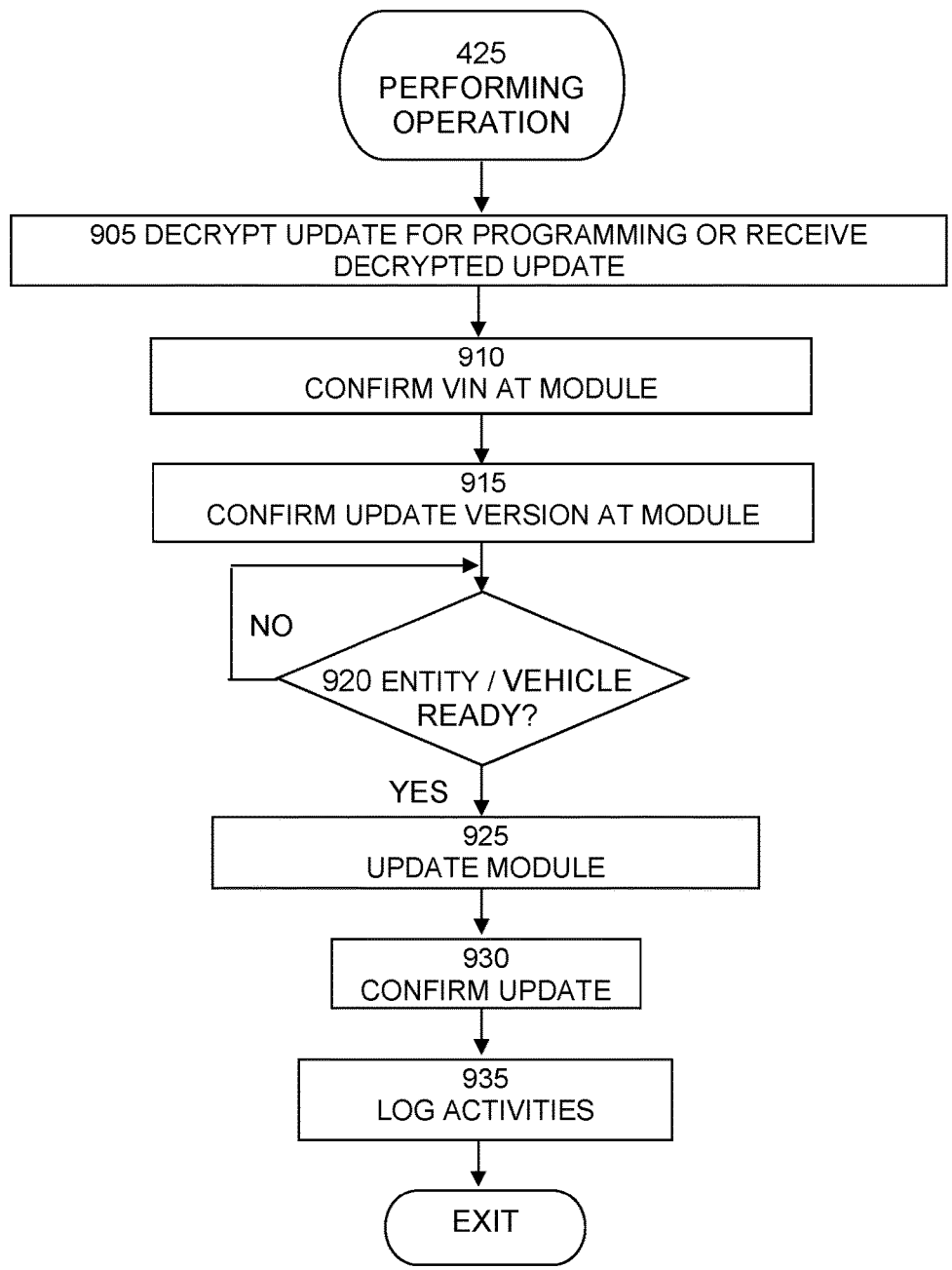
FIG. 9 is a detail level flowchart for the step of performing the operation configured in accordance with an embodiment.

FIG. 9 is a detail sub-figure flowchart 900 of step 425 in FIG. 4. Details for the step of performing the operation comprise decrypting input update for programming or receive decrypted update for entity/vehicle module 905; confirming VIN at module 910; confirming update version at module 915; is entity/vehicle ready? 920; if no, return to "is entity/vehicle ready?" 920; if yes, update module 925; confirm update 930; and log activities 935.

Figure 10:
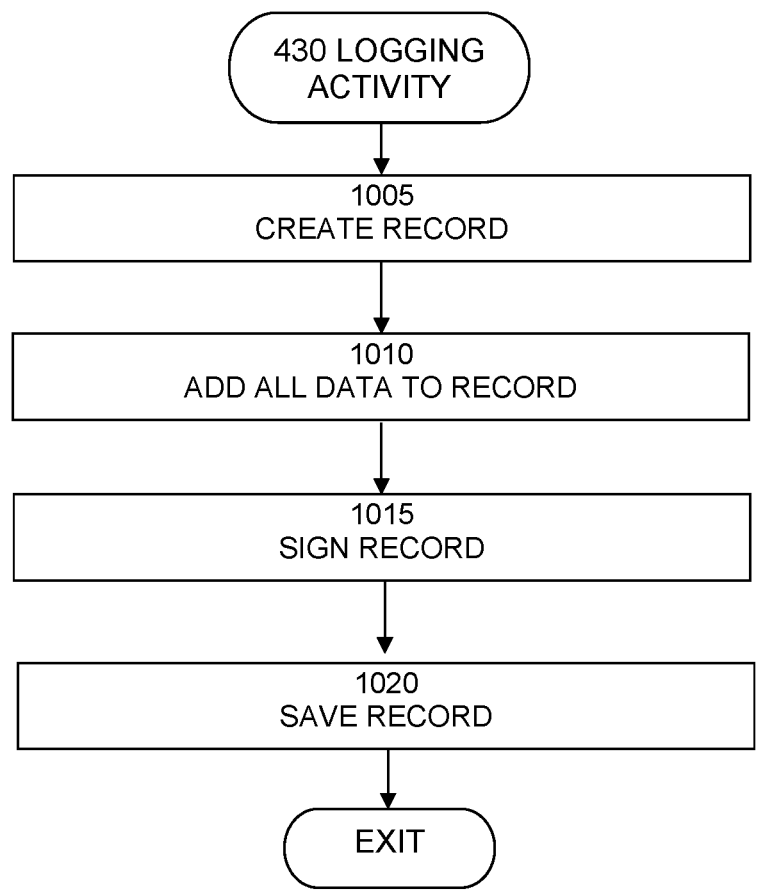
FIG. 10 is a detail level flowchart for the step of logging the activity configured in accordance with an embodiment.

FIG. 10 is a detail sub-figure flowchart 1000 of step 430 in FIG. 4. Details for the step of logging the activity comprise creating record 1005; adding all data to record 1010; sign record 1015; and save record 1020. For embodiments, the key is not added to the record as that would not be secure (unless the key was a public key). Instead, the record is created using a private key to at least sign (a public key contained in the entity/vehicle certificate could then be used to verify). The Record would include at least the VIN, date, user, and description of the operations.

Data recording details can depend on where verifying is accomplished and what is being verified. For embodiments, on the entity/vehicle if a log is created, it will be signed and encrypted with a private key. The public key can then be used by another user or entity such as the OEM to decrypt and verify that log so they can see it. If the log was created by the OEM and placed in the endpoint entity/vehicle, they would encrypt and sign with their private key, and then the user could use their public key to decrypt and verify the contents. This could be utilized for auditing that software or firmware updates were valid and correctly applied If the log was created by the OEM and placed in the endpoint entity/vehicle, they would encrypt and sign with their private key, and then the user could use their public key to decrypt and verify the contents. This could be utilized for auditing that software or firmware updates were valid and correctly applied.

The computing system used for the cryptographic verification of entity/vehicle authenticity for performing (or controlling) the operations or functions described herein with respect to the system and/or the method may include a processor, FPGA, I/O devices, a memory system, and a network adaptor. The computing system includes a program module (not shown) for performing (or controlling) the operations or functions described hereinabove with respect to the system and/or the method according to exemplary embodiments. For example, the program module may include routines, programs, objects, components, logic, data structures, or the like, for performing particular tasks or implement particular abstract data types. The processor may execute instructions written in the program module to perform (or control) the operations or functions described hereinabove with respect to the system and/or the method. The program module may be programmed into the integrated circuits of the processor. In an exemplary embodiment, the program module may be stored in the memory system or in a remote computer system storage media.

The computing system may include a variety of computing system readable media. Such media may be any available media that is accessible by the computer system, and it may include both volatile and non-volatile media, removable and non-removable media.

The memory system can include computer system readable media in the form of volatile memory, such as random access memory (RAM) and/or cache memory or others. The computer system may further include other removable/non-removable, volatile/non-volatile computer system storage media. The computer system can communicate with one or more devices using the network adapter. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to a flowchart illustration and/or block diagram of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A method for cryptographic verification of immutable authenticity, comprising:

generating a Vehicle Identification Number (VIN)—Key comprising obtaining a VIN for an entity from a trusted source;

issuing a crypto certificate for said entity associated with said VIN;

associating said crypto certificate with said VIN for said entity;

applying said VIN—Key to components of said entity using a symmetric split key such that an end user has a half of said split key, and said entity holds an other half in one or a series of hardware based secrets;

receiving input for said entity by at least one of a long range wireless communication module, a short range wireless communication module, Bring Your Own Devices (BYODs) aftermarket communication modules, and physical interface communication modules;
validating authenticity of at least one of said input and said entity in a security module comprising;
receiving said input comprising a programming update for said entity;
providing said programming update to said security module;
authenticating said programming update;
if said programming update not authenticated, terminating said programming update;
if said programming update is authenticated, directing said programming update for programming at an end use location;
authenticating programming update at said end use location;
if said programming update not authenticated, terminating programming update;
if said programming update authenticated, logging activities;
performing operation of said input if validated; and
logging said operation, whereby said authenticity of said entity is immutable and cryptographically verified.

2. The method for cryptographic verification of immutable authenticity of said entity according to claim 1, wherein said entity is a vehicle.

3. The method for cryptographic verification of immutable authenticity of said entity according to claim 1, further comprising generating said VIN—Key for an individual said entity.

4. The method for cryptographic verification of immutable authenticity of said entity according to claim 1, wherein said step of applying said VIN—Key to said entity further comprises one of:
using a fuse key based processor comprising a hardware based 'secret' embedded into it as a root of trust;
authenticating additional data and or unlocking additional keys to validate software and or firmware running within said entity; or
encrypting said code and or firmware based on multiple said symmetric split key, such that all portions of said split key are required to decrypt code.

5. The method for cryptographic verification of immutable authenticity of said entity according to claim 1, wherein said step of receiving input for said entity comprises:
receiving an update as a signed only or encrypted and signed file;
verifying authenticity in said security module;
directing said input; either
transmitting said encrypted and signed file or signed only file to its said end use location; and
verifying and decrypting said encrypted and signed file or signed only file at said end use location; or
verifying and decrypting said encrypted and signed file or signed only file in said security module; and
transmitting said decrypted file to said end use location; and
logging activities.

6. The method for cryptographic verification of immutable authenticity of said entity according to claim 1, wherein said step of directing said programming update for programming at said end use location; further comprises:
if said programming authenticated is confirmed; either
decrypting by said security module; and providing said decrypted update to said end use location for programming; or
providing said encrypted update to said end use location for programming.

7. The method for cryptographic verification of immutable authenticity of said entity according to claim 1, wherein said step of performing said operation comprises:
one of decrypting input update for programming for entity module, or receiving a decrypted update;
confirming said VIN at said module;
confirming update version at said module;
confirming said entity ready;
if said entity not ready, return to said confirming entity ready step;
if entity is ready, updating said module;
confirming said update; and
logging activities.

8. The method for cryptographic verification of immutable authenticity of said entity according to claim 1, wherein said step of logging said operation comprises:
creating a record;
adding all data to said record;
signing said record; and
saving said record.

9. The method for cryptographic verification of authenticity of said entity according to claim 1, wherein said entity is selected from the group consisting of:
robots, medical devices, energy infrastructure, automobiles, buses, trucks, trains, watercraft, planes, and drones.

10. The method for cryptographic verification of immutable authenticity of said entity according to claim 1, wherein said entity is a vehicle and processing elements of an environment of said vehicle comprise:
a USB processor;
a Bluetooth processor;
a Dedicated Short Range Communications (DSRC)-based receiver (V2X);
a passive keyless entry processor;
a remote key processor;
a Tire Pressure Monitoring System (TPMS) processor;
an Advanced Driver Assistance Systems (ADAS) system Electronic Control Unit (ECU);
an interior and exterior lighting system ECU;
an engine and transmission ECU;
steering and braking ECU;
vehicle access system ECU;
smartphone/OTA updates;
command and control servers at an Original Equipment Manufacturer (OEM);
a streaming media connection processor;
a remote link type application processor;
an airbag ECU; and
an OBD II processor.

11. The method for cryptographic verification of immutable authenticity of said entity according to claim 1, comprising a security Electronic Control Unit (ECU) coupled to components of said entity.

12. The method for cryptographic verification of immutable authenticity of said entity according to claim 1, further comprising decommissioning said platform/vehicle at end of life.

13. A non-transitory computer-readable medium comprising instructions stored thereon, that when executed on a processor cause a process to be carried out for cryptographic verification of immutable authenticity of an entity, comprising:
  generating a Vehicle Identification Number (VIN)—Key comprising obtaining a VIN for an entity from a trusted source;
  issuing a crypto certificate for said entity associated with said VIN;
  associating said crypto certificate with said VIN for said entity;
  applying said VIN—Key to components of said entity using a symmetric split key such that an end user has a half of said split key, and said entity holds an other half in one or a series of hardware based secrets;
  receiving input for said entity by at least one of a long range wireless communication module, a short range wireless communication module, Bring Your Own Devices (BYODs) aftermarket communication modules, and physical interface communication modules;
  validating authenticity of at least one of said input and said entity in a security module comprising:
    receiving said input comprising a programming update for said entity;
    providing said programming update to said security module;
    authenticating said programming update;
    if said programming update not authenticated, terminating said programming update;
    if said programming update is authenticated, directing said programming update for programming at an end use location;
    authenticating programming update at said end use location;
    if said programming update not authenticated, terminating programming update;
    if said programming update authenticated, logging activities;
  performing operation of said input if validated; and
  logging said operation, whereby said authenticity of said entity is immutable and cryptographically verified.

14. The non-transitory computer-readable medium for cryptographic verification of immutable authenticity of said entity of claim 13 wherein said entity is a medical device, and said verification comprises identifying said medical device to authenticate software/firmware executing on it.

15. The non-transitory computer-readable medium for cryptographic verification of immutable authenticity of said entity of claim 13, wherein said entity is a drone, and said verification comprises drone identification within an airspace.

16. The non-transitory computer-readable medium for cryptographic verification of immutable authenticity of an entity of claim 13, wherein said entity is a device component of an Internet of Things (IoT), and said verification comprises identifying said IoT device to authenticate software/firmware executing on it.

17. A system for cryptographic verification of immutable authenticity of a vehicle, comprising at least one processor and memory having instructions configured for:
  generating a VIN—Key for an individual entity comprising obtaining a VIN for an individual entity from a trusted source obtained by accessing a database;
  issuing a crypto certificate for said individual entity associated with said VIN;
  associating said crypto certificate with said VIN for said individual entity;
  applying a Vehicle Identification Number (VIN)—Key to components of said vehicle using a symmetric split key such that an end user has a half of said split key, and said entity holds an other half in one or a series of hardware based secrets;
  receiving input for said vehicle by at least one of a long range wireless communication module, a short range wireless communication module, Bring Your Own Devices (BYODs) aftermarket communication modules, and physical interface communication modules, using a symmetric split key such that said end user has a half of said split key, and said entity holds an other half in one or a series of hardware based secrets;
  validating authenticity of at least one of said input and said vehicle in a security module comprising
    receiving said input for a programming update for said entity;
    providing said programming update to said security module;
    confirming said programming update authenticated;
    if said programming update not confirmed, terminating said programming update;
    if said programming update is confirmed, either providing a decrypted update to an entity module or providing an encrypted update to the entity module;
    confirming programming update authenticated;
    if said programming update authenticated not confirmed, terminating programming update; and
    logging activities;
  performing operation of said input if validated; and
  logging said operation, whereby said authenticity of said vehicle is immutable and cryptographically verified.

* * * * *